United States Patent
Bulluck et al.

(10) Patent No.: US 7,144,544 B2
(45) Date of Patent: Dec. 5, 2006

(54) ULTRAVIOLET LIGHT CURING COMPOSITIONS FOR COMPOSITE REPAIR

(75) Inventors: John W. Bulluck, Spicewood, TX (US); Brad A. Rix, Spicewood, TX (US)

(73) Assignee: Texas Research International, Inc., Austin, TX (US)

( * ) Notice: Subject to any disclaimer, the term of this patent is extended or adjusted under 35 U.S.C. 154(b) by 0 days.

(21) Appl. No.: 10/784,002

(22) Filed: Feb. 20, 2004

(65) Prior Publication Data

US 2004/0235977 A1    Nov. 25, 2004

Related U.S. Application Data

(60) Provisional application No. 60/448,587, filed on Feb. 20, 2003.

(51) Int. Cl.
 *B32B 27/15* (2006.01)
 *B32B 27/30* (2006.01)
 *B29C 35/08* (2006.01)
 *B29C 35/10* (2006.01)
 *C08J 3/28* (2006.01)

(52) U.S. Cl. ............ 264/494; 264/495; 264/500; 264/511; 264/516; 522/81; 522/104; 522/100; 522/182; 522/25; 522/28; 428/413; 428/414; 428/418; 428/668; 428/426; 428/441

(58) Field of Classification Search .......... 522/81, 522/104, 100, 182, 25, 28; 428/413, 414, 428/418, 688, 426, 441; 264/494, 495, 500, 264/510, 511, 516

See application file for complete search history.

(56) References Cited

U.S. PATENT DOCUMENTS

| | | | | |
|---|---|---|---|---|
| 4,737,593 A | | 4/1988 | Ellrich et al. .......... 568/15 |
| 5,166,007 A | * | 11/1992 | Smith et al. .......... 428/63 |
| 5,399,770 A | | 3/1995 | Leppard et al. ........ 568/15 |
| 5,472,992 A | | 12/1995 | Leppard et al. ........ 522/18 |
| 5,767,169 A | * | 6/1998 | Leppard et al. ........ 522/64 |
| 5,854,298 A | | 12/1998 | McNay et al. ......... 522/25 |
| 6,099,783 A | | 8/2000 | Scranton et al. ...... 264/272.11 |
| 6,149,856 A | | 11/2000 | Zemel et al. .......... 264/401 |
| 6,284,360 B1 | | 9/2001 | Johnson et al. ........ 428/317.7 |
| 6,319,433 B1 | | 11/2001 | Kohan ................ 264/1.32 |
| 6,339,113 B1 | | 1/2002 | Han et al. ............ 522/100 |
| 6,350,792 B1 | | 2/2002 | Smetana et al. ....... 522/81 |
| 6,372,827 B1 | | 4/2002 | Johnson et al. ........ 523/467 |
| 6,486,228 B1 | | 11/2002 | Kohler et al. ......... 522/64 |
| 2002/0028288 A1 | | 3/2002 | Rohrbaugh et al. ..... 427/180 |
| 2002/0086161 A1 | | 7/2002 | Smetana et al. ....... 428/413 |

OTHER PUBLICATIONS

CN104 Epoxy Acrylate. Description. [Online]. Sartomer Company, Incorporated. [Retrived on Nov. 28, 2005]. Retrived From the Internet:<URL:www.sartomer.com/proddetail.asp?plid=2&sgid=18&prid=C104>.*

CN120 Epoxyacrylate. Product Detail. [Online]. Sartomer Company, Incorporated. [Retrived on Nov. 28, 2005]. Retrived From the Internet: <URL:www.sartomer.com/proddetail.asp?plied=2sgid=18&prid=CN120 >.*

* cited by examiner

*Primary Examiner*—Sanza L. McClendon
(74) *Attorney, Agent, or Firm*—O'Keefe, Egan & Peterman, LLP

(57) ABSTRACT

An ultraviolet (UV) light curable formulation useful for repairing composite materials, comprising: an acrylic oligomer, an acrylic monomer, and a photoinitiator. This formulation may include fiberglass. The photoinitiator can be a combination of a bis-acylphosphine oxide and an alpha hydroxy ketone. The formulation can cure rapidly, such as in about 20 minutes. The cured formulation can have a $T_g$ above 150° C.

20 Claims, No Drawings

ULTRAVIOLET LIGHT CURING COMPOSITIONS FOR COMPOSITE REPAIR

This application claims priority to U.S. Provisional Application 60/448,587, filed Feb. 20, 2003, incorporated herein by reference.

Subject to right of the assignee afforded under a Small Business Innovation Research (SBIR) program and SBIR Project AF01-131, the U.S. government has a paid-up license in this invention and the right in limited circumstances to require the patent owner to license others on reasonable terms as provided for by the terms of contract number F33615-02-C-5605 which was supported by The United States Air Force Research Laboratory at Wright-Patterson Air Force Base.

BACKGROUND OF INVENTION

This invention pertains to a UV light curable composition which may comprise an acrylic oligomer, an acrylate monomer, a photoinitiator, and a filler such as fiberglass.

Rapid, high-quality, on-aircraft repair techniques for fiberglass composite components are desirably. However, current field level repair techniques use thermally accelerated adhesive bonding to restore the original design strength of the composite laminate. In practice, several problems exist with on-aircraft thermally cured repair methods. Airframe structural members act as heat sinks, and make it difficult to obtain a uniform cure temperature profiles. Excessive power requirements can result from efforts to offset this heat sinking effect. Also, commonly used resin systems require low temperature storage to avoid premature degradation, increasing storage cost and support complexity. Furthermore, the thermally accelerated require heat blankets for cure that can be difficult to work with depending on the size and geometry of the aircraft part being repaired.

SUMMARY OF INVENTION

The present invention provides a solution to one or more of the problems and deficiencies in the prior art. For example, this invention provides an ultraviolet light curable resin system that can nullify the problems and deficiencies identified above while retaining the necessary strength and adhesion requirements for a composite repair.

In one broad respect, this invention is an ultraviolet ("UV") light curable composition useful for repairing composite materials, comprising: an acrylic oligomer, an acrylic monomer, a photoinitiator, and fiberglass. In one embodiment, the composition comprises about 10 to about 50 percent by weight of the acrylic oligomer, about 20 to about 60 percent by weight of the acrylic monomer, about 0.5 to about 3 percent by weight of the photoinitiator, and about 25 to about 75 percent by weight of the fiberglass; comprises a composition wherein the wherein the photoinitiator is a combination of a bis-acylphosphine oxide and an alpha hydroxy ketone; comprises a composition wherein the photoinitiator is a combination of a bis-acylphosphine oxide and an alpha hydroxy ketone, and wherein the bis-acylphosphine oxide to alpha hydroxy ketone ratio is from about 1:4 to about 4:1; or combination thereof.

In another broad respect, this invention is a UV curable formulation, comprising: an acrylate oligomer, a combination of two or more acrylic monomers, a bis-acylphosphine oxide, an alpha hydroxy ketone, and optionally fiberglass, wherein the cured formulation formed from the curable formulation has a $T_g$ greater than 150° C.

In another broad respect, this invention is a reaction product formed by irradiation of the UV curable composition or the UV curable formulation.

In another broad respect, this invention is a method which comprises: combining an acrylic oligomer, an acrylic monomer, and a photoinitiator; applying the resulting UV curable formulation to fiberglass to thereby form a UV curable formulation. This method may further comprise applying the UV curable formulation onto a fiberglass layer to form a UV curable composition. The method may also comprise curing the UV curable composition using UV irradiation to form a cured composition. The alternating layers of fiberglass and the uncured or cured composition of this invention form a composite material (a laminate), wherein the voids in the fiberglass may have been wetted out by application of the uncured composition.

In another broad respect, this invention is a method of repairing a hole in the exterior of an airplane, comprising: applying alternating layers of a UV curable formulation and woven fiberglass fabric to fill the hole and to form a UV curable composition; creating a vacuum across at least one side of the UV curable composition; irradiating the UV curable formulation with UV light to cure the formulation to produce a cured composition; and removing the vacuum. The vacuum can be applied using known, conventional procedures. Similarly, the UV radiation can be supplied with conventional equipment and depending on the UV curable composition can be effected by sunlight. The hole to be repaired can be of a variety of depths and widths. In general the width can be up to two feet and typically up to one foot, and the depth can be up to about 200 mils (0.2 inch), typically up to about 150 mils (0.15 inch), and typically in the range from about 10 to about 150 mils. It should be appreciated that the hole or damaged area can be partially through a given composite piece to be repaired or can be completely through the piece such as in the case of a hole through a portion of a wing or fuselage. The damaged area is typically damage to the exterior skin of the composite, though portions of the core may also be repaired using the UV curable composition. It should also be noted that the shape of the portion of the composite to be repaired can be of essentially any shape, and vary widely depending on how the damage to the composite material of the aircraft or other structure built of a composite material is damaged. In one embodiment, the repair can be performed on structures formed of Nomex honeycomb cores with thin skins, such as a structure with an aluminum core and aluminum alloy skins or an aluminum core with fiberglass-reinforced or carbon fiber-reinforced epoxy skins (sometimes referred to as having, for example, fiberglass facings). The materials to be repaired in accordance with repaired are composite materials, such as those made of using a honeycomb structure and/or made of carbon composite materials. The hole to be repaired is at least partially filled with the curable composition and then cured with UV radiation. In some cases it may be desirable or necessary to remove a skin layer so that the UV curable composition or UV curable formulation may be applied to the core rather than to an epoxy skin, so as to increase bonding and/or to enable the repair patch to have the same height as the skin; that is, to provide a repair area that is substantially similar in depth to the original epoxy skin. After exposing an additional portion of the core by removing a portion of the undamaged skin, a thin layer of UV curable formulation is applied, upon which alternating layers of fiberglass and UV curable formulation are applied (the top layer is UV curable formulation) to form the UV curable composition (i.e., a composite) having alternating layers of fiberglass and UV curable formulation. It may be desirable to at least partially shade the area where the layers are applied so that ambient UV light does not prematurely initiate cure. A vacuum bagging procedure, well known to one of skill in the art, may be employed to reduce the amount of bubbles in the final cured composition. A bagging procedure may include a number of layers of material over the UV curable composition, such as a layer of Teflon film, a layer of fiberglass, a perforated Teflon layer, fiberglass cloth, non-porous Nylon 66 separator film, a layer of breather cloth, and the vacuum bag to which is attached the vacuum source. Typically the vacuum bagging is performed at ambient temperatures. Similarly, the area may be tamped prior to irradiation to remove at least a portion of trapped air bubbles. In one embodiment, the vacuum is maintained during UV curing.

The UV cure resins of this invention do not require heating. Also, long ambient temperature storage is possible with the present invention. By the practice of this invention, cure times can be significantly reduced relative to current methods, thus increasing aircraft availability and reducing repair cost.

The main problem contemplated by the inventors was that for a UV cured approach, the difficulty is in developing a resin system with sufficient high temperature tolerance. In addition, it would be desirable for some applications if the methods for on-aircraft cure of UV resins matched the results of thermally cured resins in terms of uniform physical properties. The inventors herein sought to provide a UV cure repair solution that includes resin systems, reinforcements, vacuum bagging materials, UV illumination sources, and detailed repair procedures.

This invention provides a number of advantages over the current epoxy resin products and these advantages are detailed below. These advantages include: quick cure times on the order of minutes instead of hours; sunlight-only cures are possible; no frozen storage required; simple to apply such as being similar to ordinary epoxy resin wet layup systems; ability to cure through relatively thick bagging schedules, as long as no UV radiation blocking layer(s) are used; only a mild acrylic odor present and no styrene emission problems; easy to clean up with common solvents; no expensive and fragile hot bonders needed for field level repairs; no programming of hot bonders, with knowledge of specific ramp rates, soak times, alarm thresholds, etc., needed by the repair technician; no possibility of a runaway heat blanket with attendant fire risk; no thermocouples required; and the strength of cured resins are similar to conventional epoxies.

DETAILED DESCRIPTION OF THE INVENTION

As discussed above the formulations of this invention include one or more oligomers, one or more monomers, one or more photoinitiators, and one or more fillers. Aircraft may be repaired using standard vacuum bagging procedures, which reduces the amount of voids and detrimental effects of oxygen during cure. Standard UV lighting equipment may be employed. Several layers may be built up and simultaneously irradiated to effect curing. The formulations herein have the unique and surprising benefit of being able to fully cure despite having several layers opaque to visible light.

Oligomers

The acrylated oligomers that may be used in this invention can vary widely, and may include a variety of backbone structures in addition to the acrylate moiety, such as urethane, epoxy, and polyester functionality. An oligomer is generally referred to as a polymeric unit containing two to four, possibly more, monomer units. An oligomer is typically composed of only a few monomer units such as a dimer, trimer, tetramer, etc., or their mixtures. The upper limit of repeating units in an oligomer is usually considered to be about twenty. The term telomer is sometimes used synonymously with oligomer. Oligomers are typically higher molecular weight (1,000–30,000 g/mol) crosslinkable coating components used as the base material in a coatings formulation. The primary job of the oligomer is to impart the major physical properties of the finished coating. The oligomers employed in this invention are based on a variety of chemistries, including acrylated urethanes, epoxies, polyesters and acrylics. The acrylated oligomers used in UV/EB radical polymerization are typically viscous liquids ranging from a few thousand centipoise to greater than one million centipoise in viscosity at 25C. The acrylated oligomers typically possess two to six acrylate groups per molecule and range in molecular weight from approximately 500 to 20,000 g/mol.

In acrylate chemistry there are several families of oligomers. Each particular family has both advantages and disadvantages. The primary oligomer families are generally referred to as epoxy acrylates, urethane acrylates, polyester acrylates, polyether acrylates, amine modified polyether acrylates, and acrylic acrylates.

A representative sample of suitable acrylates is provided in Table 1.

TABLE 1

Various Acrylic Oligomers for Resin Formulation

| Tradename | Type | Manufacturer | $T_g$ (° C.) |
|---|---|---|---|
| CN975 | Hexafunctional urethane acrylate | Sartomer | 29 |
| CN104 | Epoxy acrylate | Sartomer | 67 |
| CN120 | Epoxy acrylate | Sartomer | 60 |
| CN151 | Epoxy methacrylate | Sartomer | 68 |
| BR-941 | Hexafunctional aliphatic urethane acrylate | Bomar | 83 |
| BR-970 | Aliphatic urethane acrylate | Bomar | N/A |
| BR-990 | Trifunctional urethane acrylate | Bomar | 20 |
| Genomer 4302 | Aliphatic polyester triurethane triacrylate | Rahn | 40 |
| Genomer 2252 | Acrylated bisphenol A epoxy resin | Rahn | N/A |

Epoxy acrylate oligomers impart high gloss, hardness, fast cure, pigment wetting and chemical resistance to coatings. As with the use of monomers, molecular weight, functionality and chemical nature of the epoxy acrylate also allow variability within the same class of materials. Urethane acrylate oligomers provide excellent weatherability in the case of aliphatic products, as well as abrasion resistance, scratch resistance, impact resistance and flexibility.

One of the principal roles of the oligomer species is to promote adhesion of the resin to the fiberglass of the composite, as well as increase the tensile strength and toughness by reducing brittleness. As such, choice of the oligomer is important in the practice of this invention. Typically, these properties are achieved at the expense of having lower (<50° C.) glass transition temperatures ($T_g$). Acrylated oligomers used in this invention generally form cured compositions that have a Tg in the range of 100 to 175° C. This invention provides a composition (a cured composite) that will withstand excess temperatures (>150° C., as this is the upper service temperature, e.g. 175° C.).

Aromatic difunctional epoxy acrylate oligomers may be used in one embodiment of this invention, and in one respect difunctional epoxy acrylate oligomers derived from bisphenol A may be employed. This type of oligomer has very low molecular weight that gives them some very desirable properties including, high reactivity, high gloss, high glass transition, high strength, and low physiological irritation. The cost of these products is very low. This makes these types of oligomers suitable for a wide variety of applications, ranging from overprint varnishes for paper and board to wood coatings for furniture and parquet flooring, but also high tech applications like compact disk coatings and optical fiber coatings. Their main drawbacks are high viscosity, some long-term yellowing, and limited flexibility. Because of this, they are less suitable for application on flexible substrates; low viscosity application techniques like spray-, dip-, curtain coating, and applications with high requirements in terms of color stability over a longer period of time (white and light colored substrates that have to last long).

In the absence of fiberglass, the UV curable formulations (oligomers, monomers, and photoinitiators) generally have an amount of acrylic oligomer in the range from about 20 to about 70 percent by weight, and in one embodiment is an amount in the range from about 20 to 60 percent by weight. As used herein, "UV curable formulation" or "curable resin" refer to a formulation containing oligomers, monomers, and photoinitiators, but which does not contain fiberglass. By contrast, as used herein a UV curable composition refers to a combination of the formulation with fiberglass, such as by layering formulation and fiberglass sheets to form monolithic structures that can include multiple layers of fiberglass sheets.

Monomers

In order to raise the glass transition temperatures of the cured composite resins, the aforementioned oligomers must be successfully copolymerized with one or more monomers known to have high $T_g$'s (such as those listed in Table 2), resulting in an overall resin system with a high $T_g$ while retaining the necessary toughness that is desired for composite strength. The monomers used in this invention are typically capable of raising the $T_g$ of the cured resin to above 150° C.

The acrylic monomers used in this invention can be monofunctional, difunctional, and trifunctional acrylic, acrylate and methacrylate monomers. Representative examples of such monomers include but are not limited to: methyl methacrylate (MMA), ethyl methacrylate, methacrylic acid (MA), isobornyl methacrylate (ISBM), ethylene glycol dimethacrylate (EGDM), ethoxylated bisphenol A diacrylate esters (BPADAE), tetraethylene glycol dimethacrylate (TEGDM), diethylene glycol dimethacrylate (DEGDM), diethylene glycol diacrylate (DEGDA), tris(2-hydroxyethyl) isocyanurate triacrylate (ISOTRI) as well as the diacrylate, alkyl (such as isodecyl, butyl, methyl, tetrahydrofurfuryl, and 2-ethylhexyl) or hydroxy alkyl (such as hydroxy ethyl and hydroxy propyl) esters of acrylic acid and methacrylic acid, butyleneglycol diacrylate and triacrylate, 1,6-hexanediol diacrylate, tetraethyleneglycol diacrylate and triacrylate, polyethylene glycol diacrylate and triacrylate, bisphenol A diacrylate and triacrylate, pentaerythritol diacrylate and triacrylate and tetraacrylate; alkyl and hydroxyalkyl acrylates and methacrylates, e.g. methyl, ethyl, butyl, 2-ethylhexyl and 2-hydroxyethyl acrylate, isobornyl acrylate, ethylene glycol diacrylate, propylene glycol diacrylate, neopentyl glycol diacrylate, hexamethylene glycol diacrylate, 4,4'-bis(2-acryloyloxyethoxy)diphenylpropane, trimethylolpropane triacrylate, and vinyl acrylate. Combinations of these monomers may also be employed. Likewise, one or more of these monomers may be excluded. Other monomers may be included in the curable composition of this invention depending on the end use and desired properties of the cured resin.

TABLE 2

Acrylic Monomers for Resin Formulation

| Component | Type | Manufacturer | $T_g$ (° C.) |
|---|---|---|---|
| SR 368 | Tris(2-hydroxyethyl) isocyanurate triacrylate | Sartomer | 272 |
| SR 423 | Isobornyl methacrylate | Sartomer | 110 |
| Genomer 1223 | 1,6 Hexanediol diacrylate | Rahn | 43 |
| SR 444 | Pentaerythritol triacrylate | Sartomer | 103 |
|  | Methacrylic acid | Aldrich | 216 |
|  | Methyl methacrylate | Aldrich | 105 |

Monomers are used as reactive diluents in some formulations. Monomers can also be used to achieve a number of desired properties including glass transition, adhesion, reactivity, chemical resistance, scratch resistance, and strength. Thus, selection of a given monomer can depend on one or more of these criteria. A higher amount of functionality of the monomer results in higher reactivity. A lower amount of functionality results in lower shrinkage and better adhesion. Generally the lower the molecular weight the lower the viscosity. Combinations of monomers can be used in the practice of this invention to achieve desired final properties of the cured resin.

In the absence of fiberglass, the UV curable formulations (oligomers, monomers, and photoinitiators) generally have an amount of one or more acrylic oligomers in the range from about 20 to about 90 percent by weight, and in one embodiment is an amount in the range from about 30 to about 80 percent by weight, and in a second embodiment in the range from about 40 to about 75 percent by weight. Typically, two or more monomers are employed; and in one embodiment the two or more monomers are a combination of ISOTRI, ISBM, MMA, and MA.

Photoinitiators

Photoinitiators are chemicals that form energetic radical species when exposed to UV light. They are essential ingredients in UV-curable coatings in order to obtain polymerization. Depending on factors such as film thickness, UV-light source and particular coating performance requirements, the amount of photoinitiator in a UV-coating formulation can range from approximately 0.5 to 15%. Photoinitiator systems are available that meet the particular requirements for curing very thin clear coatings, thin pigmented coatings, and very thick clear coatings.

Representative photoinitiators include but are not limited to those listed in Table 3. A particularly effective system in the practice of this invention is a 3:1 ratio of an acylphosphine (such as phenylbis(2,4,6-trimethylbenzoyl)-phenylphosphineoxide, available commercially as Irgacure 819) to phenyl ketone (such as 1-hydroxy-cyclohexyl-phenyl ketone, available commercially as Irgacure 184), which has shown to be very effective in thoroughly curing composite samples, even those approaching 5.0 mm in thickness. Photoinitiator concentrations typically range from about 0.5 to about 3.0 percent by weight of the UV curable formulation. The bis-acylphosphine oxide and the α-hydroxy ketone combination of photoinitiators were found to be very effective because of their ability to initiate cure in thick sections of a composite formed from resin and fiberglass layers.

TABLE 3

Various Photoinitiators for Resin Formulation

| Initiator | Type | Manufacturer |
|---|---|---|
| Irgacure 819 | Acylphosphine oxide[a] | Ciba |
| Irgacure 184 | Phenyl ketone | Ciba |
| Irgacure 2020 | Mixture of a phosphine oxide and a hydroxy ketone[b] | Ciba |
| ITX | Benzophenone derivative | First Chemical |

[a]Irgacure 819 is phenylbis(2,4,6-trimethylbenzoyl)-phenylphosphineoxide.
[b]Irgacure 2020 is a mixture of 20% phenylbis(2,4,6-trimethylbenzoyl)-phosphine oxide) and 80% 2-hydroxy-2-methyl-1-phenyl-propan-1-one.

A variety of photoinitiators can be used in the practice of this invention. Representative, non-limiting examples of the photoinitiators include benzophenone derivatives, acylphosphine oxide, bis-acylphosphine oxide, and α-hydroxy ketone. Representative non-limiting examples of α-hydroxy ketones include 2-hydroxy-2-methyl-1-phenyl-propan-1-one, 1-[4-2-hydroxyethoxy)-phenyl]-2-hydroxy-2-methyl-propane-1-one, 1-hydroxycyclohexylphenylketone, camphorquinone, and combinations thereof. Bis-acylphosphine oxides and acylphosphine oxides are well known materials that are disclosed, for example, in U.S. Pat. Nos. 4,737,593; 4,792,632; 5,399,770; 5,472,992; and 6,486,228. A representative non-limiting example of an acylphosphine oxide is diphenyl(2,4,6-trimethylbenzoyl)phosphine oxide. A representative non-limiting example of a bisacylphosphine oxide is phenylbis(2,4,6-trimethylbenzoyl)-phenylphosphineoxide. Combinations of bisacylphosphine oxide and acylphosphine oxides can be employed, such as a combination of diphenyl(2,4,6-trimethylbenzoyl)phosphine oxide and phenylbis(2,4,6-trimethylbenzoyl)-phenylphosphineoxide. It is important that the photoinitiator be capable of facilitating the UV curing through the one or more layers of composition, which can be readily determined by one of skill in the art.

In one embodiment of this invention, the photoinitiator is bis-acylphosphine oxide, α-hydroxy ketone, or a mixture thereof.

In the absence of fiberglass, a curable formulation will typically have about 20 to about 70 percent of one or more acrylic oligomer, about 30 to about 80 percent of one or more acrylic monomers, 0.5 to about 3 percent of one or more photoinitiators, or combination thereof. In the absence of fiberglass, a curable formulation will typically have about 20 to about 70 percent of one or more acrylic oligomer, about 30 to about 80 percent of two or more acrylic monomers, 0.5 to about 3 percent of two or more photoinitiators such as a mixture of bis-acylphosphine oxide and alpha hydroxy ketone, or combination thereof. In one embodiment, the formulation may contain about 25 to about 60 percent of one or more acrylic oligomer, about 40 to about 75 percent of one or more acrylic monomer, and 0.5 to about 3 percent of one or more photoinitiator. In one embodiment, the formulation may contain about 25 to about 60 percent of one or more acrylic oligomer, about 40 to about 75 percent of one or more acrylic monomers, and 0.5 to about 3 percent of two or more photoinitiators.

Fiberglass

Fiberglass may be included in the UV curable compositions of this invention. The fiberglass may be incorporated a variety of ways. For example, fiberglass particles (or fibers, or fiberglass in a variety of shapes and sizes, including unidirectional or fabric) can be admixed with a resin formulation to provide a heterogeneous mixture of oligomer, monomer, photoinitiator, and fiberglass particles.

Quartz filler or fabric may also be used in addition to or as an alternative to the fiberglass.

Typically, alternating layers of resin and woven fiberglass fabrics are employed. In this embodiment, a structure that may be considered to be multilayered can be formed by applying a layer of resin to a woven fiberglass layer, placing another layer of woven fiberglass on the resin layer, applying a layer of resin to the second fiberglass layer, and so on. In this way, a multilayered structure with alternating resin and fiberglass layers are built up. It should be appreciated that the fiberglass layer becomes wetted out, thus there may not be discrete layers per se. Using glass fabric as opposed to other glass reinforcement insures the highest weight to strength ratio possible for the resultant laminate. Glass and quartz fabric reinforcements permit good transmission of the ultraviolet radiation needed for free radical initiation. The number of such layers employed may vary depending on the intended end us, size of the overall composition, and so on. After the desired numbers of layers are built up, the composition that now contains fiberglass and curable resin (the UV curable formulation) can be irradiated with UV light to effect curing. Owing to the photoinitiators used in the practice of this invention, the structure can thereby be cured. The time required to effect curing may vary depending on a variety of factors such as amount of resin, layers of resin, temperature, type of formulation, strength and type of the UV light source or wavelengths, and so on. In general, the time required to effect curing may be less than one hour, typically less than 30 minutes, and often in about 20 minutes. This time is dramatically less than the time required for the widely used thermally curable materials employed today for aircraft composite repair.

When the UV curable composition is used to repair composite materials such as in some modem aircraft wings and exterior skin, the UV curable composition is typically subjected to curing in a "vacuum bagging" procedure. In this regard, the composition is covered with plastic (typically on one side only) and a vacuum is pulled on the bag. In this way a vacuum is maintained over at least one surface of the composition. The part being bagged is subjected to a compressive force that minimizes voids. This facilitates the composition to be cured with minimal production of voids in the cured product. Such bagging procedures are well known to those skilled in the art of composite repair, particularly for composite repair of airplanes.

Several representative woven glass fibers as well as their weaves and sizings are shown below in Table 4.

TABLE 4

Woven Glass Fiber obtained for Composite Formulation

| Glass Fiber # | Sizing | Source |
|---|---|---|
| 7500 | | Abaris |
| 1581 | 627 (proprietary silane) | Abaris |
| 7781 | 497A (proprietary silane) | BGF |
| 7781 | 627 (proprietary silane) | BGF |
| 120 | 497A (proprietary silane) | BGF |
| 120 | 627 (proprietary silane) | BGF |

The weave of the fiber is a factor in the wetability of the resin, its drapeability, as well as a determiner in the penetrability of the ultraviolet light, affecting the curing of the resin. Fiberglass with a 1581 or 7781 satin weave provided a tight weave (57×54 yarns per inch count for both types)

and sufficient thickness (0.0099" for 1581 and 0.0089" for 7781). The construction is specified as, warp ECG (electrical glass, continuous filament, filament diameter of $3.6\times10^{-3}$ inches) 1501/2 with a breaking strength of 198 lbs./inch and in the fill direction or roll width ECG 1501/2 with a breaking strength of 175 lbs./inch. The fiberglass may be employed in an amount of from about 20 to about 80 percent by weight, in one embodiment from about 50 to about 70 percent by weight, based on the final total weight of the composition including the fiberglass.

A typical UV curable composition of this invention may include about 10 to about 50 percent by weight of one or more oligomers, about 20 to about 60 percent by weight of one or more monomers, about 0.5 to about 3 percent by weight of one or more photoinitiators, from about 25 to about 75 percent by weight of fiberglass, or combination thereof.

Ultraviolet Equipment and Measuring Devices

This invention may use an ultraviolet light source (such as Honle UVASPOT 400/T) as well as a radiometer (such as EIT Powermap) with which to measure the transmittance of the UV light through the sample composite to aid in maximizing the cure rate and percent cure. Suitable UV sources may also include those manufactured by Phillips Corporation, HPM high pressure halide lamps, HPA medium pressure metal halide lamps, HPR high pressure mercury vapor lamps, generally having a wavelength of 300 to 450 nanometers (nm). A chamber may be constructed out of UV absorbing Plexiglas to protect observers from UV radiation. The intensity of the UV light can be adjusted by adjusting the height of the lamp above the sample within the chamber.

Cured Compositions

The cured compositions of this invention have a $T_g$ above 150° C., typically have a $T_g$ above 155° C., and in one embodiment have a $T_g$ above 175° C. The Tg of the laminate was determined using dynamic mechanical analysis and the Tg identified as the peak of the tan delta at a frequency of 1 hertz, ASTM E1640. The cured compositions of this invention may be characterized as having an elastic modulus generally greater than 2,000 psi, more typically greater than 2,500 psi, and in one embodiment greater than 3,000 psi, as determined by a four-point bend on an Instron instrument according to ASTM D6272. The cured compositions of this invention typically have the water absorptions less than 0.5 percent, and in one embodiment less than 0.3 percent, as determined using ASTM D570.

Additional Components

The composition of this invention may also include a variety of additional filler materials, which may impart additional structural integrity to the cured composition or to add some other property. Representative non-limiting examples of such fillers include inorganic fillers such as quartz, glass, silica, talc, carbon black, gypsum, metal oxides, calcium carbonate, and the like.

Depending on compatibility, the composition may include minor amounts of, or be devoid of, other components, such as but no limited to light stabilizers, antioxidants, pigments, and so on.

The following examples illustrate the instant invention but are not intended to limit the scope of the invention or claims thereof. Unless indicated otherwise, all percentages are by weight. The formulations in the examples below have excellent adhesion to a variety of substrates and are free of hazardous air pollutants.

Representative UV Cure Resins

Certain UV resin formulations were prepared to acquire enough data from observations and physical testing. The developmental formulations are shown in Tables 5A and 5B, and the corresponding test results are shown in Table 5C.

TABLE 5A

| COMPONENT | 5A wt % | 5B wt % | 5C wt % | 5D wt % | 5E wt % | 5F wt % |
|---|---|---|---|---|---|---|
| CN151 | 17.1 | | 43.2 | 40.1 | 45.7 | 45.0 |
| SR368 (ISOTRI) | 10.2 | 16.6 | 14.2 | 26.8 | 30.3 | 18.0 |
| Isobornyl methacrylate | 23.9 | 41.2 | 20.8 | | | 18.0 |
| Methyl methacrylate | | | | | | |
| Methacrylic acid | | | | | | |
| Genomer 4302 | 23.9 | | | | | |
| ACMO | | | | | | |
| Genomer 1456 | | | | | | |
| Genomer 1343 | | | | | | |
| Genomer 1223 | 23.9 | 41.2 | 20.8 | 32.1 | 23.0 | 18.0 |
| Initiator (3:1 184/819) | 1.0 | 1.0 | 1.0 | 1.0 | 1.0 | 1.0 |

TABLE 5B

| COMPONENT | 5G wt % | 5H wt % | 5I wt % | 5J wt % | 5K wt % | 5L wt % |
|---|---|---|---|---|---|---|
| CN151 | | 50.1 | 51.0 | 57.7 | 57.7 | 55.7 |
| SR368 (ISOTRI) | 13.2 | 20.5 | 20.8 | | | 19.5 |
| Isobornyl methacrylate | 28.5 | | | | | |
| Methyl methacrylate | | | | | | |
| Methacrylic acid | | 11.7 | | 11.7 | 11.7 | 11.1 |
| Genomer 4302 | 41.9 | | | | | |
| ACMO | | | 13.6 | | | |
| Genomer 1456 | | | | | 16.5 | |
| Genomer 1343 | | | | 16.5 | | 12.7 |
| Genomer 1223 | 15.4 | 16.7 | 13.6 | 13.1 | 13.1 | |
| Initiator (3:1 184/819) | 1.0 | 1.0 | 1.0 | 1.0 | 1.0 | 1.0 |

TABLE 5C

Formulations used to develop design of experiment matrix

| SAMPLE | Fiberglass | # Plies | Tg | Peaks | Stress @ 5% Strain |
|---|---|---|---|---|---|
| 5A | 1581 | 10 | 140 | 1-shoulder | |
| 5B | 1581 | 7 | 177 | 2 | |
| 5C | 1581 | 15 | 150 | 1-shoulder | |
| 5D | 1581 | 15 | 164 | 1 - broad | 4150 |
| 5E | 1581 | 15 | 165 | 1 - broad | 3677 |
| 5F | 1581 | 15 | 165 | 1 - broad | 4267 |
| 5G | 1581 | 15 | 130 | 1 - broad | 4124 |
| 5H | 1581 | 15 | 176 | 1 - broad | 5855 |
| 5I | 7781 (497A) | 10 | 168 | 1 - broad | 3790 |
| 5J | 7781 (497A) | 10 | 170 | 1-shoulder | 3893 |
| 5K | 7781 (497A) | 10 | 167 | 1 - broad | 3933 |
| 5L | 7781 (497A) | 10 | 169 | 1-shoulder | 3459 |

Typical lay-ups constructed for testing were ten glass plies thick, corresponding to a thickness of 0.11–0.19 in (2.8–4.8 mm), dependent on the viscosity of the resin.

Cure of these composite samples is complete after twenty minutes of exposure to ultraviolet radiation under vacuum. The vacuuming of the composite sample removes oxygen from the system that can inhibit the free radical polymerization process and result in incomplete cure.

After cure is complete (20 minutes), the sample is removed from the vacuum bag and cut into pieces for physical testing.

Experimental Design Optimization

An experimental design matrix was constructed using the following components: CN151, SR368, methacrylic acid, methyl methacrylate, isobomyl methacrylate, and initiator (3:1 Irgacure 184:819). The responses to be tested were flexural modulus, glass transition temperature, water absorption, peak tan delta, and the stress at 5% strain.

These candidate composite resin formulations were then used to construct an optimized UV curable resin for aircraft repair. Below are the design summary and the data entry sheet for the series of designed experiments using Degin Expert software version 6.0 to develop and optimize the formulations.

TABLE 6

| Design Summary | | | |
|---|---|---|---|
| Design Summary | | | |
| Study Type | Mixture | Experiments | 14 |
| Initial Design | D-optimal | Blocks | No Blocks |
| Design Model | Quadratic | | |

TABLE 6-continued

| Design Summary | | | | | |
|---|---|---|---|---|---|
| Response | Name | Units | Observation | Minimum | Maximum | Trans |
| Y1 | Flexural Modulus | psi | 0 | No Data | No Data | None |
| Y2 | Tg | | 0 | No Data | No Data | None |
| Y3 | Water Absorption | % | 0 | No Data | No Data | None |
| Y4 | Peak Tan Delta | | 0 | No Data | No Data | None |
| Y5 | Stress at 5% Strain | psi | 0 | No Data | No Data | None |

| Component | Name | Units | Type | Low Actual | High Actual | Low Coded |
|---|---|---|---|---|---|---|
| A | Oligomer | Wt. % | Mixture | 30 | 79.5 | 0 |
| B | Monomers | Wt. % | Mixture | 20 | 68 | 0 |
| C | Photoinitiators | Wt. % | Mixture | 0.5 | 3 | 0 |
| | | | | Total = | 100 | |

TABLE 7

Data Entry Sheet for Designed Experiments

| Block | Run #1 Block 1 | | Run #2 Block 1 | | Run #3 Block 1 | | Run #4 Block 1 | | Run #5 Block 1 | | Run #6 Block 1 | |
|---|---|---|---|---|---|---|---|---|---|---|---|---|
| Oligomer | 55.5 | Wt. % | 64.55 | Wt. % | 78.25 | Wt. % | 31.5 | Wt. % | 77 | Wt. % | 31.5 | Wt. % |
| Monomers | 44 | Wt. % | 34.3 | Wt. % | 20 | Wt. % | 68 | Wt. % | 20 | Wt. % | 68 | Wt. % |
| Photoinitiators | 0.5 | Wt. % | 1.15 | Wt. % | 1.75 | Wt. % | 0.5 | Wt. % | 3 | Wt. % | 0.5 | Wt. % |
| Flexural Modulus | | psi | | psi | | psi | | psi | | psi | | psi |
| Tg | | ° C. | | ° C. | | ° C. | | ° C. | | ° C. | | ° C. |
| Water Absorption | | % | | % | | % | | % | | % | | % |
| Peak Tan Delta | | | | | | | | | | | | |
| Stress at 5% Strain | | psi | | psi | | psi | | psi | | psi | | psi |

| Block | Run #7 Block 1 | | Run #8 Block 1 | | Run #9 Block 1 | | Run #10 Block 1 | | Run #11 Block 1 | | Run #12 Block 1 | |
|---|---|---|---|---|---|---|---|---|---|---|---|---|
| Oligomer | 77 | Wt. % | 52.55 | Wt. % | 30 | Wt. % | 39.8 | Wt. % | 79.5 | Wt. % | 79.5 | Wt. % |
| Monomers | 20 | Wt. % | 46.3 | Wt. % | 67 | Wt. % | 57.8 | Wt. % | 20 | Wt. % | 20 | Wt. % |
| Photoinitiators | 3 | Wt. % | 1.15 | Wt. % | 3 | Wt. % | 2.4 | Wt. % | 0.5 | Wt. % | 0.5 | Wt. % |
| Flexural Modulus | | psi | | psi | | psi | | psi | | psi | | psi |
| Tg | | ° C. | | ° C. | | ° C. | | ° C. | | ° C. | | ° C. |
| Water Absorption | | % | | % | | % | | % | | % | | % |
| Peak Tan Delta | | | | | | | | | | | | |

TABLE 7-continued

Data Entry Sheet for Designed Experiments

| Stress at 5% Strain | psi | psi | psi | psi | psi | psi |
|---|---|---|---|---|---|---|

| | Block | Run #13 Block 1 | | Run #14 Block 1 | |
|---|---|---|---|---|---|
| | Oligomer | 49.6 | Wt. % | 30 | Wt. % |
| | Monomers | 48.6 | Wt. % | 67 | Wt. % |
| | Photoinitiators | 1.8 | Wt. % | 3 | Wt. % |
| | Flexural Modulus | | psi | | psi |
| | Tg | | ° C. | | ° C. |
| | Water Absorption | | % | | % |
| | Peak Tan Delta | | | | |
| | Stress at 5% Strain | | psi | | psi |

Ten formulations, shown in Tables 8 and 9, were developed based on the optimization of the resin formulation.

TABLE 8

Formulations from first matrix

| COMPONENT | 8A weight % | 8B Weight % | 8C weight % | 8D weight % | 8E weight % |
|---|---|---|---|---|---|
| CN151 | 55.50 | 64.55 | 78.25 | 31.50 | 77.00 |
| SR368 (ISOTRI) | 17.60 | 13.72 | 8.00 | 27.20 | 8.00 |
| Isobornyl methacrylate (ISBM) | 11.00 | 8.58 | 5.00 | 17.00 | 5.00 |
| Methyl methacrylate (MMA) | 6.60 | 5.15 | 3.00 | 10.20 | 3.00 |
| Methacrylic acid (MA) | 8.80 | 6.86 | 4.00 | 13.60 | 4.00 |
| Initiator (3:1 184/819) | 0.50 | 1.15 | 1.75 | 0.50 | 3.00 |
| Total | 100.00 | 100.00 | 100.00 | 100.00 | 100.00 |

TABLE 9

Formulations from first matrix

| COMPONENT | 9A weight % | 9B weight % | 9C weight % | 9D weight % | 9E weight % |
|---|---|---|---|---|---|
| CN151 | 52.55 | 30.00 | 39.80 | 79.50 | 49.60 |
| SR368 (ISOTRI) | 18.52 | 26.80 | 23.12 | 8.00 | 19.44 |
| Isobornyl methacrylate (ISBM) | 11.58 | 16.75 | 14.45 | 5.00 | 12.15 |
| Methyl methacrylate (MMA) | 6.95 | 10.05 | 8.67 | 3.00 | 7.29 |
| Methacrylic acid (MA) | 9.26 | 13.40 | 11.56 | 4.00 | 9.72 |
| Initiator (3:1 184/819) | 1.15 | 3.00 | 2.40 | 0.50 | 1.80 |
| Total | 100.00 | 100.00 | 100.00 | 100.00 | 100.00 |

Following physical testing of the ten formulations, a second experimental design matrix was constructed using identical parameters to those used in the original matrix. The components included CN151, SR368, methacrylic acid, methyl methacrylate, isobornyl methacrylate, and initiator (3:1 Irgacure 184:819). The responses to be tested were flexural modulus, glass transition temperature, water absorption, peak tan delta, and the stress at 5% strain. The eight formulations from this design are shown below in Tables 10a and 10b.

TABLE 10a

| COMPONENT | 10A Weight % | 10B Weight % | 10C Weight % | 10D Weight % |
|---|---|---|---|---|
| CN151 | 30.00 | 31.21 | 47.89 | 58.37 |
| SR368 (ISOTRI) | 26.80 | 27.20 | 20.65 | 16.45 |
| Isobornyl methacrylate (ISBM) | 16.75 | 17.00 | 12.90 | 10.28 |
| Methyl methacrylate (MMA) | 10.05 | 10.20 | 7.74 | 6.17 |
| Methacrylic acid (MA) | 13.40 | 13.60 | 10.32 | 8.23 |
| Initiator (3:1 184/819) | 3.00 | 0.79 | 0.50 | 0.50 |
| Total | 100.00 | 100.00 | 100.00 | 100.00 |

TABLE 10b

| COMPONENT | 11A Weight % | 11B Weight % | 11C Weight % | 11D Weight % |
|---|---|---|---|---|
| CN151 | 54.79 | 51.14 | 48.11 | 54.79 |
| SR368 (ISOTRI) | 17.88 | 19.34 | 20.56 | 17.88 |
| Isobornyl methacrylate (ISBM) | 11.18 | 12.09 | 12.85 | 11.18 |
| Methyl methacrylate (MMA) | 6.71 | 7.25 | 7.71 | 6.71 |
| Methacrylic acid (MA) | 8.94 | 9.67 | 10.28 | 8.94 |
| Initiator (3:1 184/819) | 0.50 | 0.50 | 0.50 | 0.50 |
| Total | 100.00 | 100.00 | 100.00 | 100.00 |

These formulations were subjected to physical tests.

Physical Testing

Testing the UV-curable composite samples included determination of percent resin, determination of glass transition temperature, water absorption, four-point bending for strength analysis, and measuring cure temperatures. The glass fiber used in these composites was the 7781 weave with a 497A sizing supplied by BFG Industries. All composite samples for testing were constructed out of 10 plies of the glass fiber. Two commercial epoxies were also obtained for select comparison testing (Vantico 52A/B and Vantico 50A/9449 resin systems). The 50A/9449 system was cured at room temperature for 24 hours, followed by 2 hrs at 150° F. for maximum Tg. The 52A/B system was cured for 2 hours at 200° F.

TABLE 11

| Sample | % Resin | Tg (° C.) | Stress @ 5% Strain (psi) | % Water Absorption |
|---|---|---|---|---|
| 8A | 55.4 | 170 | 2907 | 0.24 |
| 8B | 55.0 | 159 | 3653 | 0.31 |
| 8C | 52.9 | 146 | 2922 | 0.29 |
| 8D | 41.3 | 175 | 2654 | 0.26 |
| 8E | 49.3 | 131 | 2472 | 0.31 |
| 9A | 41.5 | 169 | 3335 | 0.26 |
| 9B | 41.1 | 179 | 2521 | 0.14 |
| 9C | 47.3 | 174 | 3502 | 0.22 |
| 9D | 43.7 | 138 | 2245 | 0.18 |
| 9E | 46.2 | 168 | 3003 | 0.27 |
| Vantico 52A/B | — | 124 | 3107 | — |
| Vantico 50A/9449 | — | 80 | 2966 | — |

Percent Resin

Composite samples were burned at 600° C. in a muffle furnace for 1 hour in order to burn off the resin and determine the percentage of the components. The differences in the percents resin are dependent on the relative viscosity of the resin formulations, excess resin with a higher viscosity is less readily removed from the wetted glass fabric, usually resulting in a "build-up" of resin between glass plies. The results are shown in Table 12.

TABLE 12

Percent resin in acrylic resin composites

| Sample | % Resin |
|---|---|
| 8A | 55.4 |
| 8B | 55.0 |
| 8C | 52.9 |
| 8D | 41.3 |
| 8E | 49.3 |
| 9A | 41.5 |
| 9B | 41.1 |
| 9C | 47.3 |
| 9D | 43.7 |
| 9E | 46.2 |

Glass Transition Temperature

Glass transition temperatures were determined using dynamic mechanical analysis (DMA), in which the mechanical response of the composite sample is measured as it is deformed under periodic stress as the temperature is elevated. The response of the sample to heating changes dramatically once the $T_g$ is reached and the sample softens. Typical sample sizes are 50 mm×12 mm×2.5 mm.

The glass transition temperatures of the experimental design formulation composites are shown in Table 13, along with the commercial epoxy composites. The glass transition temperatures of the acrylic resin formulations exceed those of both Vantico commercial resins (the commercial Vantico resins not an embodiment of the invention), and most of the Tg's exceed 150° C.

TABLE 13

Glass transition temperatures

| Sample | Tg (° C.) | Number of Peaks in DMA Plot |
|---|---|---|
| 8A | 170 | 2 |
| 8B | 159 | 2 |
| 8C | 146 | 2 |
| 8D | 175 | 2 |
| 8E | 131 | 2 |
| 9A | 169 | 2 |
| 9B | 179 | 2 |
| 9C | 174 | 2 |
| 9D | 138 | 2 |
| 9E | 168 | 2 |
| Vantico 52A/B | 124 | 1 |
| Vantico 50A/9449 | 80 | 2 |

Stress @5% Strain

The stress at 5% strain was determined by four-point bend on an Instron instrument according to ASTM D6272. The stresses for the experimental design formulation composites are shown in the table below along with those observed for two commercial products: Vantico 50A/B and 52A/9449. Several of the resin formulations showed either comparable or greater resistance to elevated stresses than the example commercial epoxies currently in use.

TABLE 14

Stress @ 5% strain (4-point bend) for acrylate and Vantico resin composites

| Sample | Stress @ 5% Strain (psi) |
|---|---|
| 8A | 2907 |
| 8B | 3653 |
| 8C | 2922 |
| 8D | 2654 |
| 8E | 2472 |
| 9A | 3335 |
| 9B | 2521 |
| 9C | 3502 |
| 9D | 2245 |
| 9E | 3003 |
| Vantico 52A/B | 3107 |
| Vantico 50A/9449 | 2966 |

Water Absorption

Due to fact that some of the monomers and oligomers used in the resin formulations are hydrophilic in nature, the water absorptions of the composites were determined using ASTM D570. Samples were weighed before and after complete immersion in distilled water for 24 hours at room temperature. Percent water absorption is presented below in Table 15.

TABLE 15

Water absorption data for acrylic resin composites

| Sample | % Water Absorption |
| --- | --- |
| 8A | 0.24 |
| 8B | 0.31 |
| 8C | 0.29 |
| 8D | 0.26 |
| 8E | 0.31 |
| 9A | 0.26 |
| 9B | 0.14 |
| 9C | 0.22 |
| 9D | 0.18 |
| 9E | 0.27 |

Cure Temperature

The cure temperature of a composite was measured underneath a 10-ply sample using a thermocouple. The temperature was recorded before exposure to the UV lamp, every five seconds after initial exposure, and then less frequently as the changes in temperature with time were smaller. A plot of temperature versus time showed that a low exotherm of less than 100° C. occurred, with the peak temperature of ~60° C. was reached at 35–40 seconds.

A study was done to determine the effects of temperature extremes on the curing of the acrylate resins. A 0.1825" thick sample was prepared and heated to 60° C. (140° F.) then exposed to ultraviolet radiation. Cure was accomplished within 2 minutes.

At the other temperature extreme, a 0.1825" thick sample was prepared and cooled to −30° C. (−22° F.) and exposed to ultraviolet radiation. The sample was kept in a −30° C. (−22° F.) atmosphere by suspension over liquid nitrogen. Despite the frigid air around the sample and the initial temperature of the sample itself, the temperature of the sample became very hot within 30 seconds of UV exposure as the reaction was initiated. Complete cure was observed within two minutes. Apparently, neither hot nor cold temperatures have any appreciable effect on the cure of the resin systems.

Based upon the results of the physical testing of the second round of eight formulations, four formulations were chosen to be used in simulated aircraft repairs. The formulations are shown in Table 16, and Table 17 outlines the pertinent physical data.

TABLE 16

| COMPONENT | 16A Weight % | 16B Weight % | 16C Weight % | 16D Weight % |
| --- | --- | --- | --- | --- |
| CN151 | 30.00 | 31.21 | 47.89 | 54.79 |
| SR368 (ISOTRI) | 26.80 | 27.20 | 20.65 | 17.88 |
| Isobornyl methacrylate (ISBM) | 16.75 | 17.00 | 12.90 | 11.18 |
| Methyl methacrylate (MMA) | 10.05 | 10.20 | 7.74 | 6.71 |
| Methacrylic acid (MA) | 13.40 | 13.60 | 10.32 | 8.94 |
| Initiator (3:1 184/819) | 3.00 | 0.79 | 0.50 | 0.50 |
| Total | 100.00 | 100.00 | 100.00 | 100.00 |

TABLE 17

Physical properties of the four formulations from Table 16

| Sample | Tg (° C.) | Number of Peaks in DMA Plot | % Resin | Stress @ 5% Strain (psi) | % Water Absorption |
| --- | --- | --- | --- | --- | --- |
| 16A | 173 | 2 | 31.9 | 1784 | 0.39 |
| 16B | 176 | 2 | 37.4 | 1966 | 0.40 |
| 16C | 165 | 1 (shoulder) | 49.1 | 2721 | 0.28 |
| 16D | 157 | 2 | 49.3 | 2616 | 0.26 |

Perform and Test Composite Repairs

Although bagging schedules may vary depending on the particular resin type or the number of layers of resin-soaked glass fabric, it has been found that an excellent bagging schedule for the optimized formulations may consist of one layer of Teflon-coated fiberglass over the wet lay-up, followed by a 120 style fiberglass bleeder, a layer of P3 perforated fluoropolymer, another 120 fiberglass bleeder, and a Nylon barrier layer topped with a 120 fiberglass layer as a breather.

Almost all samples were cured at 20 minutes with a Honle UVASPOT/400T ultraviolet lamp at a distance of about 9 inches. The exceptions included a sample that was cured in direct sunlight for 20 minutes. However, prepreg composite samples were effectively used in a room with large windows, allowing for at least 20 minutes of working time without any appreciable cure occurring via indirect sunlight. The core of this repair had 11 plies of composite and appeared to cure thoroughly from visual inspection.

Kevlar fabric was also used in performing a wet lay-up with one of the resins. Following the standard twenty-minute cure, only the top of the uppermost of the four layers cured. No cure occurred below the top layer.

A composite repair was also attempted on a leading edge, a more challenging geometry, using the standard bagging schedule and cure time. The cure was effective over the full area of the repair, around the entire diameter of the curved repair.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A method of repairing a hole in the exterior of an airplane, comprising:
    applying alternating layers of (1) an ultraviolet light curable formulation which comprises an acrylic oligomer, an acrylic monomer, and a photoinitiator and (2) woven fiberglass fabric to fill the hole and to form an ultraviolet light curable composition;
    creating a vacuum across at least one side of the ultraviolet light curable composition;

irradiating the ultraviolet light curable formulation with ultraviolet light to cure the formulation to produce a cured composition; and removing the vacuum.

2. The method of claim 1, wherein the ultraviolet light curable formulation comprises: an acrylate oligomer, a combination of two or more acrylic monomers, a bis-acylphosphine oxide and an alpha hydroxy ketone, wherein the cured formulation formed from the curable formulation has a $T_g$ greater than 150° C.

3. The method of claim 1, wherein the acrylic oligomer is an epoxy acrylate, urethane acrylate, polyester acrylate, polyether acrylate, amine modified polyether acrylate, acrylic acrylate, or combination thereof.

4. The method of claim 1, wherein the acrylic oligomer is an epoxy acrylate.

5. The method of claim 1, wherein the acrylic monomer is selected from the group consisting of: methyl methacrylate (MMA), ethyl methacrylate, methacrylic acid (MA), isobornyl methacrylate (ISBM), ethylene glycol dimethacrylate (EGDM), ethoxylated bisphenol A diacrylate esters (BPADAE), tetraethylene glycol dimethacrylate (TEGDM), diethylene glycol dimethacrylate (DEGDM), diethylene glycol diacrylate (DEGDA), tris(2-hydroxyethyl) isocyanurate triacrylate (ISOTRI); a diacrylate, an alkyl or hydroxy alkyl esters of acrylic acid; a diacrylate, an alkyl or hydroxy alkyl esters of methacrylic acid; butyleneglycol diacrylate and triacrylate, 1,6-hexanediol diacrylate, tetraethyleneglycol diacrylate and triacrylate, polyethylene glycol diacrylate and triacrylate, bisphenol A diacrylate and triacrylate, pentaerythritol diacrylate and triacrylate and tetraacrylate; methyl acrylate, ethyl acrylate, butyl acrylate, 2-ethylhexyl acrylate, 2-hydroxyethyl acrylate, isobornyl acrylate, ethylene glycol diacrylate, propylene glycol diacrylate, neopentyl glycol diacrylate, hexamethylene glycol diacrylate, 4,4'-bis(2-acryloyloxyethoxy)diphenylpropane, trimethylolpropane triacrylate, vinyl acrylate, and combinations thereof.

6. The method of claim 1, comprising as the acrylic monomer a combination of tris(2-hydroxyethyl)isocyanurate triacrylate, isobornyl methacrylate, methyl methacrylate, 1,6-hexanediol diacrylate, and methacrylic acid.

7. The method of claim 1, wherein the formulation comprises about 20 to about 70 percent of the acrylic oligomer, about 30 to about 80 percent of the two or more acrylic monomers, and 0.5 to about 3 percent of the photoinitiator.

8. The method of claim 1, wherein the wherein the photoinitiator is a combination of a bis-acylphosphine oxide and an alpha hydroxy ketone.

9. The method of claim 1, wherein the wherein the photoinitiator is a combination of a bis-acylphosphine oxide and an alpha hydroxy ketone, wherein the bis-acylphosphine oxide to alpha hydroxy ketone ratio is from about 1:4 to about 4:1.

10. The method of claim 1, wherein the cured composition has a $T_g$ greater than 150° C.

11. A method of repairing a hole in the exterior of an airplane, comprising:

applying alternating layers of (1) an ultraviolet light curable formulation which comprises at least 20 percent by weight of an acrylic oligomer, at least about 30 percent by weight of an acrylic monomer, and a photoinitiator and (2) woven fiberglass fabric to fill the hole and to form an ultraviolet light curable composition;

creating a vacuum across at least one side of the ultraviolet light curable composition;

irradiating the ultraviolet light curable formulation with ultraviolet light to cure the formulation to produce a cured composition; and removing the vacuum.

12. The method of claim 11, wherein the ultraviolet light curable formulation comprises: an acrylate oligomer, a combination of two or more acrylic monomers, a bis-acylphosphine oxide and an alpha hydroxy ketone, wherein the cured formulation formed from the curable formulation has a $T_g$ greater than 150° C.

13. The method of claim 11, wherein the acrylic oligomer is an epoxy acrylate, urethane acrylate, polyester acrylate, polyether acrylate, amine modified polyether acrylate, acrylic acrylate, or combination thereof.

14. The method of claim 11, wherein the acrylic oligomer is an epoxy acrylate.

15. The method of claim 11, wherein the acrylic monomer is selected from the group consisting of: methyl methacrylate (MMA), ethyl methacrylate, methacrylic acid (MA), isobornyl methacrylate (ISBM), ethylene glycol dimethacrylate (EGDM), ethoxylated bisphenol A diacrylate esters (BPADAE), tetraethylene glycol dimethacrylate (TEGDM), diethylene glycol dimethacrylate (DEGDM), diethylene glycol diacrylate (DEGDA), tris(2-hydroxyethyl) isocyanurate triacrylate (ISOTRI); a diacrylate, an alkyl or hydroxy alkyl esters of acrylic acid; a diacrylate, an alkyl or hydroxy alkyl esters of methacrylic acid; butyleneglycol diacrylate and triacrylate, 1,6-hexanediol diacrylate, tetraethyleneglycol diacrylate and triacrylate, polyethylene glycol diacrylate and triacrylate, bisphenol A diacrylate and triacrylate, pentaerythritol diacrylate and triacrylate and tetraacrylate; methyl acrylate, ethyl acrylate, butyl acrylate, 2-ethylhexyl acrylate, 2-hydroxyethyl acrylate, isobornyl acrylate, ethylene glycol diacrylate, propylene glycol diacrylate, neopentyl glycol diacrylate, hexamethylene glycol diacrylate, 4,4'-bis(2-acryloyloxyethoxy)diphenylpropane, trimethylolpropane triacrylate, vinyl acrylate, and combinations thereof.

16. The method of claim 11, comprising as the acrylic monomer a combination of tris(2-hydroxyethyl)isocyanurate triacrylate, isobornyl methacrylate, methyl methacrylate, 1,6-hexanediol diacrylate, and methacrylic acid.

17. The method of claim 11, wherein the formulation comprises about 20 to about 70 percent of the acrylic oligomer, about 30 to about 80 percent of the two or more acrylic monomers, and 0.5 to about 3 percent of the photoinitiator.

18. The method of claim 11, wherein the wherein the photoinitiator is a combination of a bis-acylphosphine oxide and an alpha hydroxy ketone.

19. The method of claim 11, wherein the wherein the photoinitiator is a combination of a bis-acylphosphine oxide and an alpha hydroxy ketone, wherein the bis-acylphosphine oxide to alpha hydroxy ketone ratio is from about 1:4 to about 4:1.

20. The method of claim 11, wherein the cured composition has a $T_g$ greater than 150° C.

* * * * *

UNITED STATES PATENT AND TRADEMARK OFFICE
CERTIFICATE OF CORRECTION

PATENT NO. : 7,144,544 B2 Page 1 of 1
APPLICATION NO. : 10/784002
DATED : December 5, 2006
INVENTOR(S) : John W. Bulluck et al.

It is certified that error appears in the above-identified patent and that said Letters Patent is hereby corrected as shown below:

In claim 1, column 18, line 63, delete "olipomer" and insert --oligomer--.

In claim 2, column 19, line 9, delete "$T_9$" and insert --$T_g$--.

In claim 8, column 19, line 48, delete "wherein the". $2^{nd}$ occurance

In claim 18, column 20, line 52, delete "wherein the". $2^{nd}$ occurance

In claim 19, column 20, line 55, delete "wherein the". $2^{nd}$ occurance

Signed and Sealed this

Twentieth Day of February, 2007

JON W. DUDAS
*Director of the United States Patent and Trademark Office*